United States Patent [19]

Stefansky

[11] Patent Number: 5,274,288
[45] Date of Patent: Dec. 28, 1993

[54] LOW NOISE SPIN MOTOR FOR USE IN DISK DRIVE

[75] Inventor: Frederick Mark Stefansky, Longmont, Colo.

[73] Assignee: Conner Peripherals, Inc., San Jose, Calif.

[21] Appl. No.: 531,855

[22] Filed: Jun. 1, 1990

[51] Int. Cl.⁵ .................. H02K 5/16; H02K 7/08
[52] U.S. Cl. ........................ 310/90; 310/51; 360/99.08; 384/544
[58] Field of Search ............ 310/15, 51, 89, 90; 360/98.07, 98.06, 99.03, 99.04, 99.07, 99.08; 384/504, 544

[56] References Cited

U.S. PATENT DOCUMENTS

| | | | |
|---|---|---|---|
| 4,628,384 | 12/1986 | Raj et al. | 360/99.08 |
| 4,777,549 | 10/1988 | Dushkes et al. | 360/98.07 |
| 4,814,914 | 3/1989 | Hagiwara et al. | |
| 4,818,907 | 4/1989 | Shirotori | 360/99.08 |
| 4,979,056 | 12/1990 | Squires et al. | 360/69 |

FOREIGN PATENT DOCUMENTS

| | | |
|---|---|---|
| 54927 | 10/1974 | Australia. |
| 0170017 | 2/1986 | European Pat. Off. ............ 384/504 |
| 596402 | 11/1929 | Fed. Rep. of Germany. |
| 3629049A1 | 3/1988 | Fed. Rep. of Germany. |
| 0189940 | 8/1987 | Japan ............................. 310/90 |

Primary Examiner—R. Skudy
Assistant Examiner—E. To
Attorney, Agent, or Firm—Fliesler, Dubb, Meyer & Lovejoy

[57] ABSTRACT

A low noise spin motor for use in a disk drive includes two bearings having different inside diameters, different outside diameters, and preferably the same size balls. The balls in the larger bearing travel at a faster speed thereby increasing the noise frequencies and resonant frequency as compared to the smaller frequency whereby the noise from the two bearings is not compounded. A small and compact disk drive using the spin motor is described.

16 Claims, 7 Drawing Sheets

FIG. 11

LOW NOISE SPIN MOTOR FOR USE IN DISK DRIVE

CROSS REFERENCE TO RELATED APPLICATION

This application is related to the following copending applications assigned to the present assignee:

STABILIZED DISK DRIVE SPIN MOTOR, U.S. Ser. No. 341,070, filed Apr. 20, 1989, now U.S. Pat. No. 4,965,476;

ARCHITECTURE FOR 2½ INCH DIAMETER SINGLE DISK DRIVE, U.S. Ser. No. 978,149, filed Nov. 16, 1992, which is a continuation of U.S. Ser. No. 865,704, filed Apr. 4, 1992, now abandoned, which is a continuation of U.S. Ser. No. 746,139, filed on Aug. 13, 1991, now abandoned, which is a continuation of U.S. Ser. No. 508,960, filed Apr. 12, 1990, now abandoned, which is a continuation-in-part of U.S. Ser. No. 416,108, filed Oct. 2, 1989, now abandoned, which is a continuation-in-part of U.S. application Ser. No. 387,944, filed Jul. 31, 1989, which issued as U.S. Pat. No. 5,025,335 on Jun. 18, 1991;

DISK DRIVE SYSTEM CONTROLLER ARCHITECTURE, U.S. Ser. No. 057,289, filed Jun. 2, 1987, now U.S. Pat. No. 4,979,056;

DISK DRIVE SOFTWARE SYSTEM ARCHITECTURE, U.S. Ser. No. 790,008, filed Nov. 4, 1991, which is a file wrapper continuation of U.S. Ser. No. 488,386, filed Feb. 23, 1990, now abandoned, which is a file wrapper continuation of U.S. Ser. No. 057,806, filed Jun. 2, 1987, now abandoned.

LOW-POWER, HARD DISK DRIVE SYSTEM ARCHITECTURE, U.S. Ser. No. 564,693, filed Aug. 7, 1990, which is a file wrapper continuation of U.S. Ser. No. 152,069, filed Feb. 4, 1988, now abandoned;

MAGNETIC PARKING DEVICE FOR DISK DRIVE, U.S. Ser. No. 643,703, filed Jan. 22, 1991, now U.S. Pat. No. 5,170,300, which is a file wrapper continuation of U.S. Ser. No. 269,873, filed Nov. 10, 1988, now abandoned; and DISK DRIVE SYSTEM USING MULTIPLE EMBEDDED QUADRATURE SERVO FIELDS, U.S. Ser. No. 860,299, filed Mar. 27, 1992, which is a file wrapper continuation of U.S. Ser. No. 780,443, filed Oct. 17, 1991, now abandoned, which is a file wrapper continuation of U.S. Ser. No. 386,504, filed Jul. 27, 1989, now abandoned.

DISK DRIVE SYSTEM USING MULTIPLE EMBEDDED QUADRATURE SERVO FIELDS, U.S. Ser. No. 386,504, filed Jul. 27, 1989.

Each of these related applications is hereby incorporated by reference.

BACKGROUND OF THE INVENTION

This invention relates generally to spin motors as used in magnetic disk drives, and more particularly the invention relates to spin motor having reduced resonances.

Disk drive manufacturers and computer manufacturers usually establish standards for vibration and shock resistance for hard disk drives or (disk files) for data storage. The standards may be more stringent for disk drives intended for use in portable or lap-top computers or other harsh environments. Vibration and impact acceptance evaluations may be conducted by placing the drive being evaluated on a vibration table and subjecting the drive to vibrations of varying frequency and amplitude while the drive is operating. The performance of the drive is monitored to determine the frequency and amplitude of the applied vibrations which cause errors in seeking and/or track following. Seek and/or track following errors often result in "hesitations" in reading and/or writing data, and disk drives which are sensitive to applied vibrations may fail acceptance evaluations.

One effect of vibrations applied to a disk drive, and one cause of errors in seeking and/or track following is mechanical off-tracking, i.e., an unintended physical movement of the heads with respect to the disk(s). Mechanical off-tracking may be caused by movements of various structural components of the spin motor which cause the disk to tilt or wobble out of a plane normal to the axis of the motor spindle or by movements of other components of the disk drive with respect to the disk.

Among the criteria imposed on hard disk drives are vibration resistance, compactness, low weight, low power, and ease of manufacture—particularly reduced part count. All of these criteria are usually important to a computer manufacturer selecting a disk drive for use in a specific computer or for a specific type of application. Resistance to applied vibrations depends in part on the internal operating vibrations experienced by a spin motor because applied and internal vibrations may add under certain circumstances. Accordingly, improving the resistance of hard disk drives to applied vibrations is a continuing goal of disk drive manufacturers.

SUMMARY OF THE INVENTION

An object of the present invention is a spin motor for use in a disk drive having reduced resonances.

Another object of the invention is a low noise spin motor which is readily manufactured.

A feature of the invention is a spin motor having two bearings with different inside diameters and different outside diameters whereby the bearings have different resonant frequencies.

Briefly, the motor includes a shaft, a rotor including a multiple pole annular magnet, and bearing means including the two ball bearings having different diameters for rotatably mounting the rotor to the shaft. A stator including multiple windings induces the rotor to rotate.

Preferably, the balls in the two bearings are the same size, but the bearings in the larger bearing travel at a faster speed thereby increasing the resonant frequency of the larger bearing. Since the resonant frequencies are different, the noise from the two bearings is not compounded.

The invention and objects and features thereof will be more readily apparent from the following detailed description of a disk drive including a spin motor in accordance with the invention and appended claims when taken with the drawing.

DETAILED DESCRIPTION OF ILLUSTRATIVE EMBODIMENTS

Figure 1:
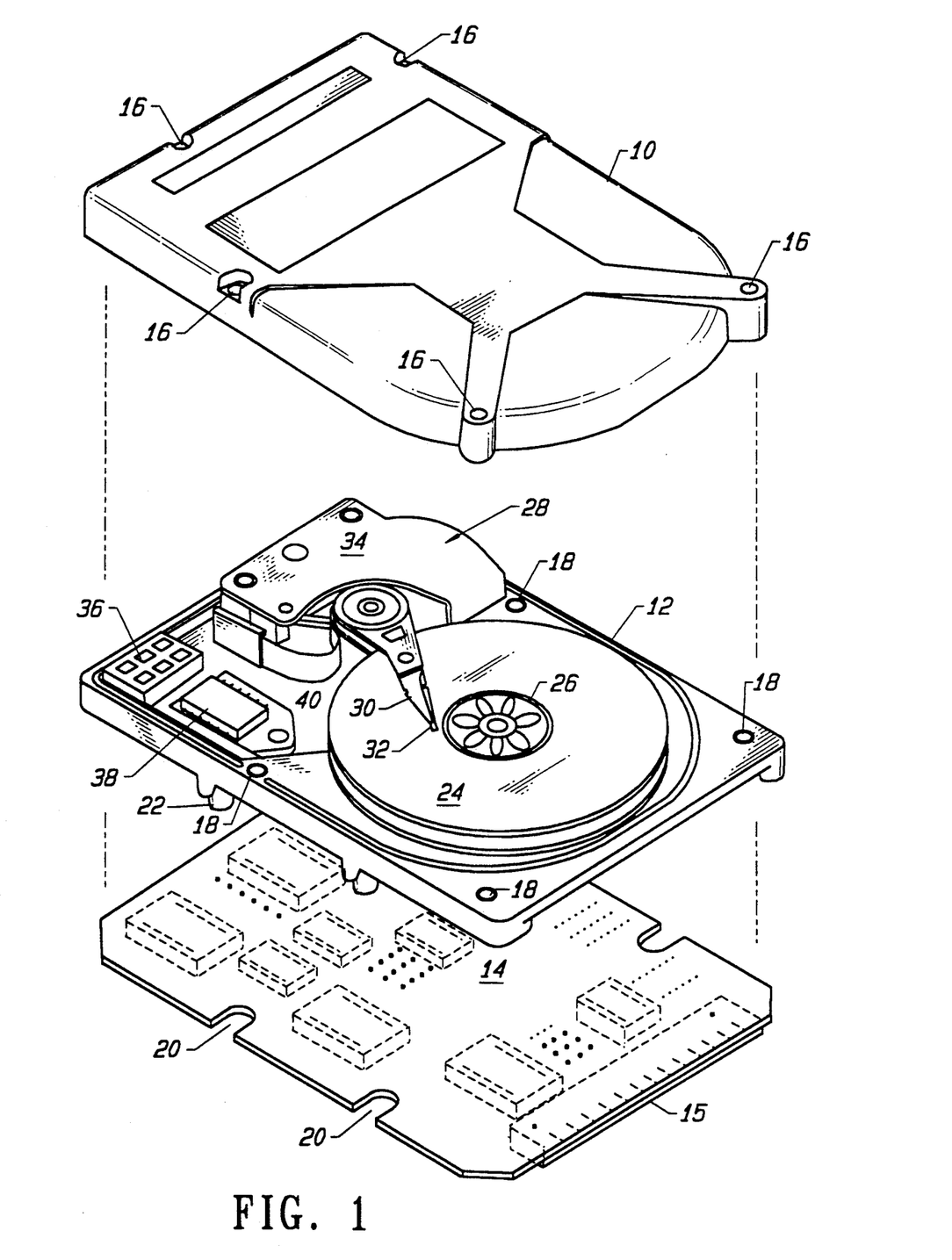
FIG. 1 is an exploded perspective view of a disk drive including a spin motor in accordance with one embodiment of the invention.
Figure 2:
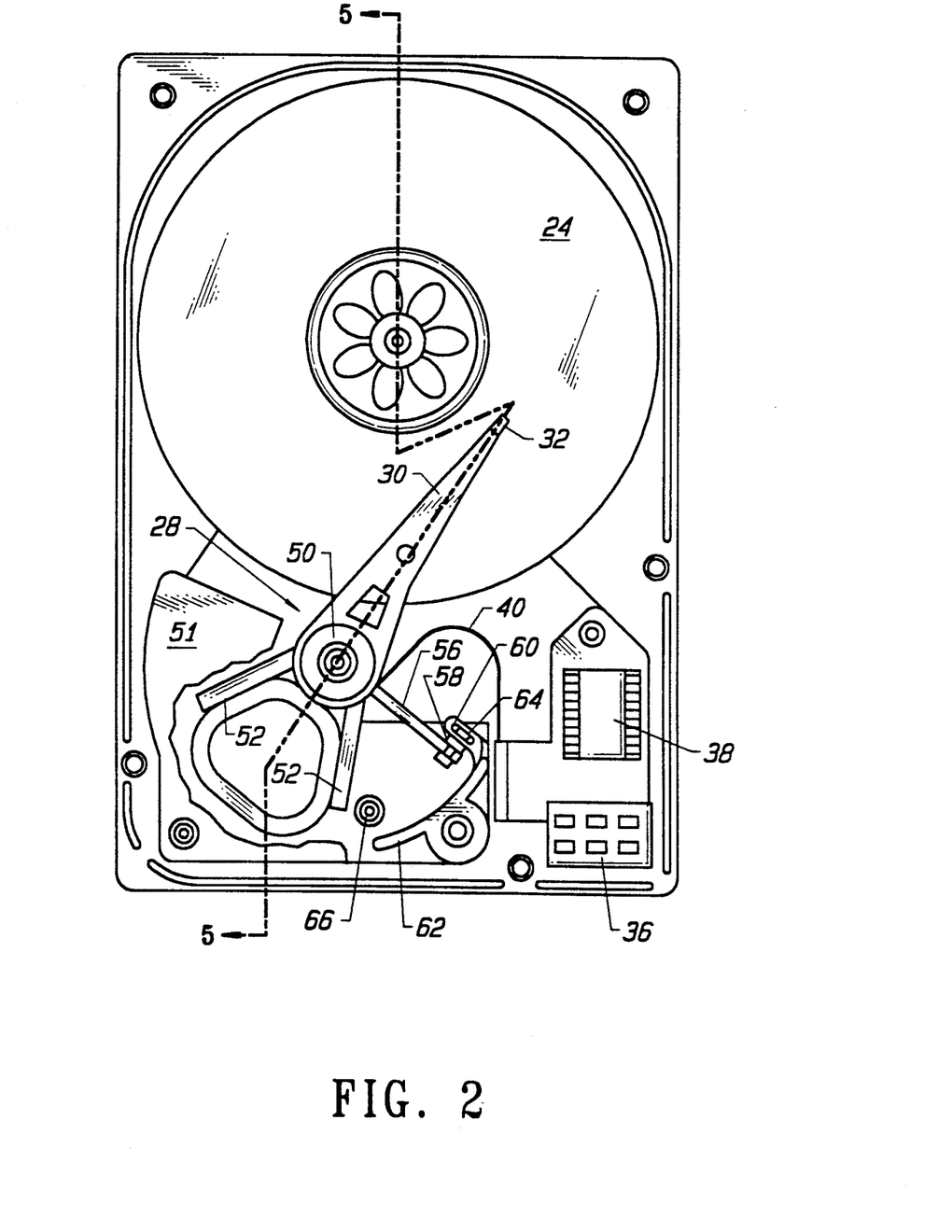
FIG. 2 is a plan view of the disk drive of FIG. 1 with the cover removed.

Referring now to the drawing, FIG. 1 is an exploded perspective view of a disk drive having a spin motor in accordance with one embodiment of the invention, and FIG. 2 is a plan view of the disk drive with the cover removed. The disk drive has the form factor of 4"×2¾"×0.75", with two disks providing sixty Mega bytes of data storage as opposed to twenty Mega bytes of data storage in the copending application. The length of the drive is approximately the width of a three and one-half inch drive and the width is approximately one-half of the length of a three and one-half inch drive. The dimensions of the disk drive are: length 4 inches; width 2¾ inch; and height 0.75 inch. Further, one embodiment of the disk drive weighs less than approximately six (6) ounces. Implementing the disk drive in a plug-in module allows the disk drive to be easily transferred from one computer to another and to be used in lap-top and notebook computers.

In FIG. 1 the cover 10 and base 12 are made from cast magnesium alloy material with bearing surfaces thereof machined to provide a proper fit. A printed circuit board 14 on the bottom of base 12 has circuitry for operating the disk drive. The cover 10 mates with the base 12 with screws (not shown) inserted through holes 16 in cover 10 and threadably engaging holes 18 in the base 12. Slots 20 in the printed circuit board 14 receive mounting posts 22 extending from the base 12. Connector 15 at one end of printed circuit board 14 connects with the computer system.

A pair of disks 24 are fastened to a spin motor by clamp 26. As the disks are rotated by the spin motor an actuator 28 having a plurality of arms 30 move pick-up heads 32 mounted at the end of arms 30 across the surfaces of the disks 24 for recording and retrieving data. Actuator 28 includes a magnetic assembly shown generally at 34 for driving the heads across the disk surfaces. The actuator assembly will be described in more detail with reference to FIG. 3.

A header 36 interconnects actuator interface circuitry 38 with the control circuitry on printed circuit board 14. The interface circuitry 38 is interconnected with the voice coil motor of actuator 28 through flexible ribbon cable 40.

FIG. 2 is a plan view of the disk drive with the cover removed and with the magnetic top plate 51 partially removed to further illustrate the actuator assembly. An actuator body 50 is rotatably mounted to the drive base 12 of the disk drive with the actuator body including support arms 52 for the voice coil 54. A crash stop arm 56 extends from the actuator body and supports a latch plate 58 which engages a polyurethane bumper 60 on latch body 62 to limit the inward travel of the arm 30 and head 32. The latch plate comprises magnetically permeable material which can be yieldably retained by a magnet 64 in a housing of the latch body 62 when the actuator assembly is in a locked position while the disk drive is not operating. A second crash stop comprising a plastic peg 66 limits the outward movement of suspension 30 and head 32. The peg 66 can be removed to facilitate movement of the suspension 30 and head 32 out off of the disk location when the disks 24 are removed from the drive.

Figure 3:
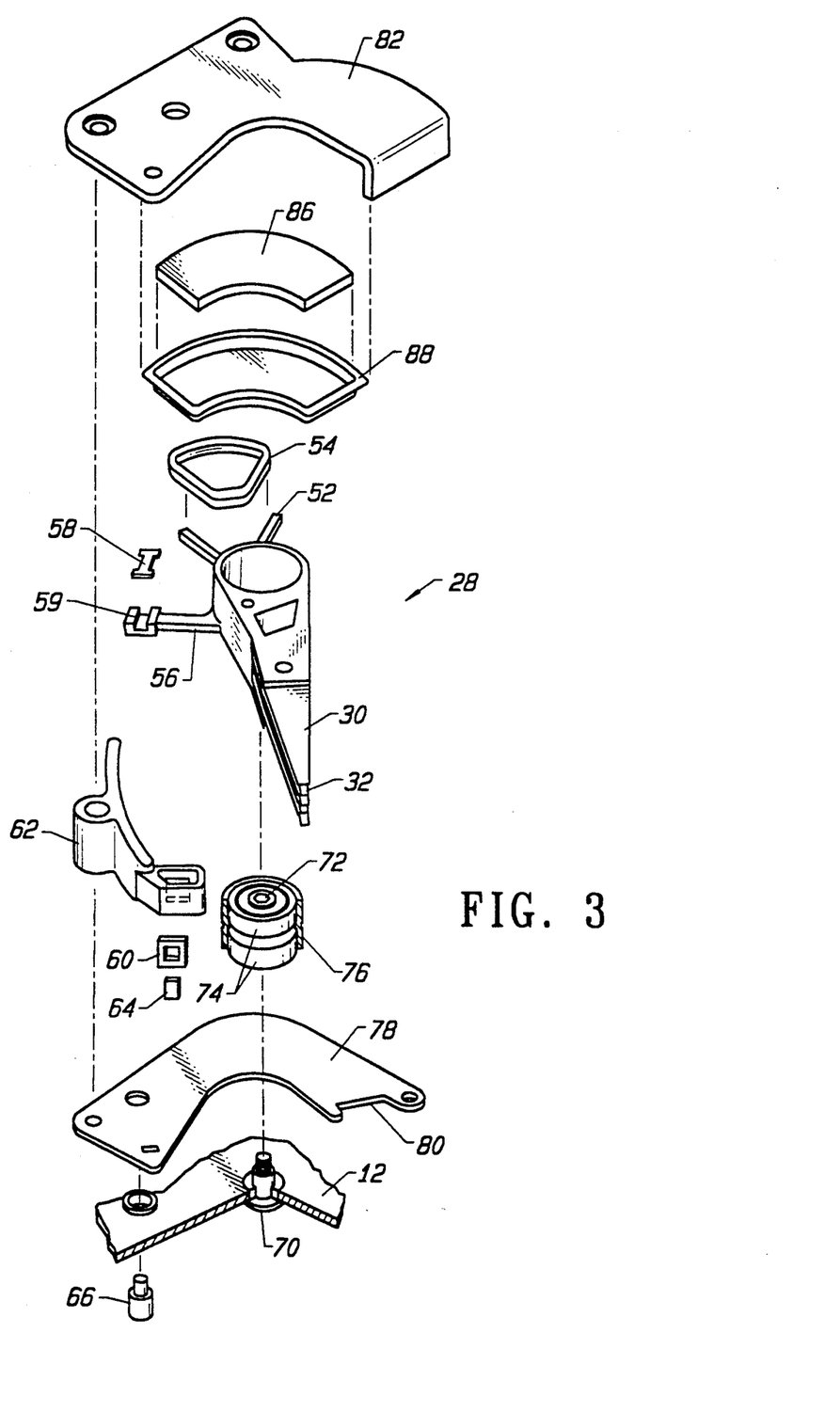
FIG. 3 is an exploded perspective view of the head actuator assembly of the disk drive of FIG. 1.

Referring now to FIG. 3, an exploded view of the actuator 28 is illustrated. The actuator is mounted on a plug insert 70 which engages a hole 71 in the base 12 in a forced fit. The plug insert 70 has a threaded end which is threadably engaged by a shaft 72 having a slotted end portion. Shaft 72 supports two bearings 74 within a housing 76 (shown in section). Housing 76 is received by the actuator base 50 thereby allowing the actuator base to rotate on the bearings around the stationary shaft 72 and insert 70.

The magnet assembly includes a bottom plate 78 having a notch 80 in one end thereof. A top plate 82 has a projection 84 which mates with the notch 80 of bottom plate 78. A magnet 86 is affixed to the bottom surface of top plate 82 by a suitable adhesive such as LOCTITE adhesive manufactured by Loctite Canada, Inc. of Messessauga, Ontario L4W253 with a magnetic shield 88 provided over the magnet. The magnet is preferably a rare earth material and the shield 88 is made of aluminum. Bottom plate 78, top plate 82, and latch body 62 provide a path for magnetic flux from magnet 86 through coil 54.

The latch plate 58 fits in a slot 59 of the latch body 62 and engages the polyurethane bumper mounted on magnet 64 which is housed in one end of latch body 62.

Figure 4:
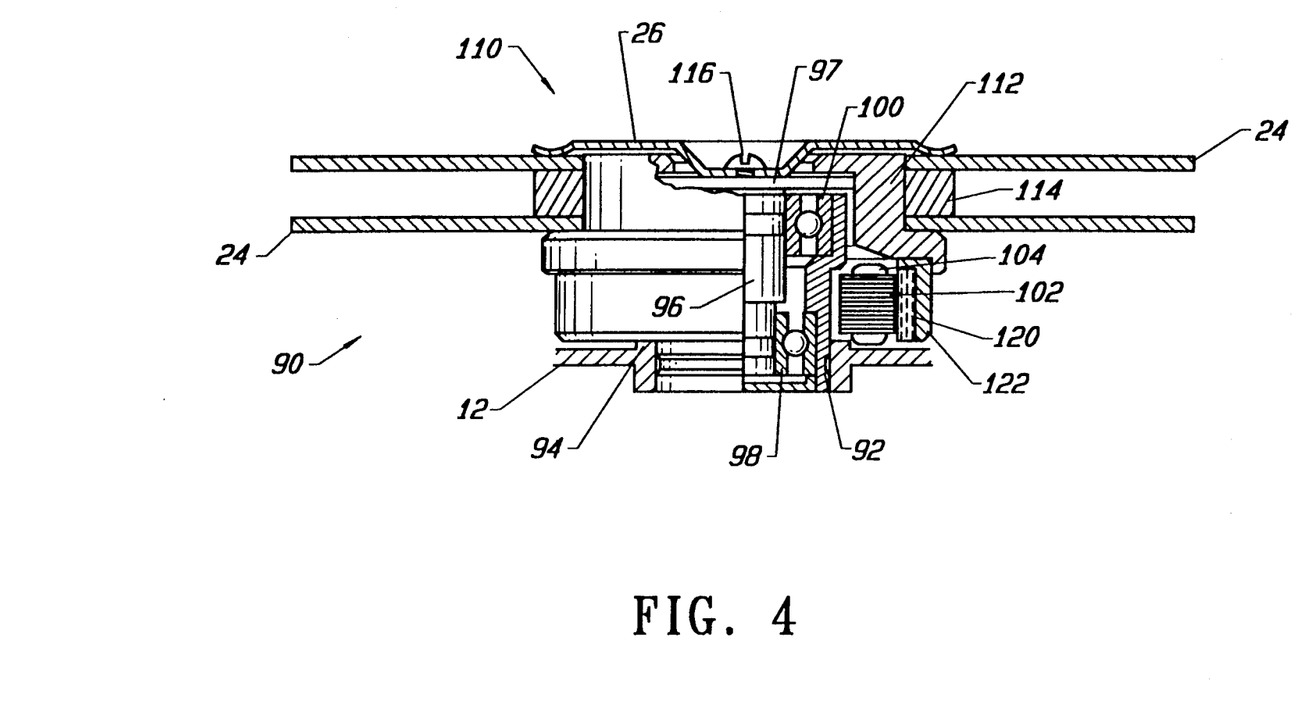
FIG. 4 is a side view partially in section of the spin motor in the disk drive of FIG. 1.

FIG. 4 is a side view partially in section of the spin motor for driving the disks. A bearing housing 92 is adhesively bonded to a shoulder 94 in the base 12. A shaft 96 supports two bearings 98 and 100 in the bearing housing 92. In accordance with one feature of the invention, the bearings 98, 100 have different diameters but the same size balls which results in a reduction of motor noise. More particularly, it has been found that the larger bearing has a higher resonant frequency since the balls are travelling at a higher rotational speed than do the balls in the smaller bearing. By having different resonant frequencies, the vibration noise of the two bearings do not resonate together, thereby decreasing the magnitude of the noise or develop a beat frequency.

Mounted around the outside of bearing housing 92 is a lamination assembly 102 which supports nine coils 104. The coils are energized by the control circuitry on printed circuit board 14 to rotate a spindle shown generally at 110 mounted on the shaft 96. The motor operates as a brushless DC motor in which armature (coil) assembly is stationary.

Spindle 110 includes a hub 112 on which are mounted the disks 24 with an aluminum spacer 114 therebetween. The disks are maintained on hub 112 by means of clamp 26 which is affixed to the shaft by screw 116. The width of the spokes of clamp 26 determine the pressure exerted on the disks, and thickness of the spokes determines the yield or "spring" of the clamp. Hub 112 engages flange 97 of shaft 96 in an interference fit.

A six pole annular magnet 120 is affixed to hub 112 by means of a housing 122 of highly permeable low carbon steel. The housing is affixed to the hub by means of adhesive. Energization of the coils 104 drives the magnetic ring 120 and the spindle 110 to which the ring is affixed.

Figure 5:
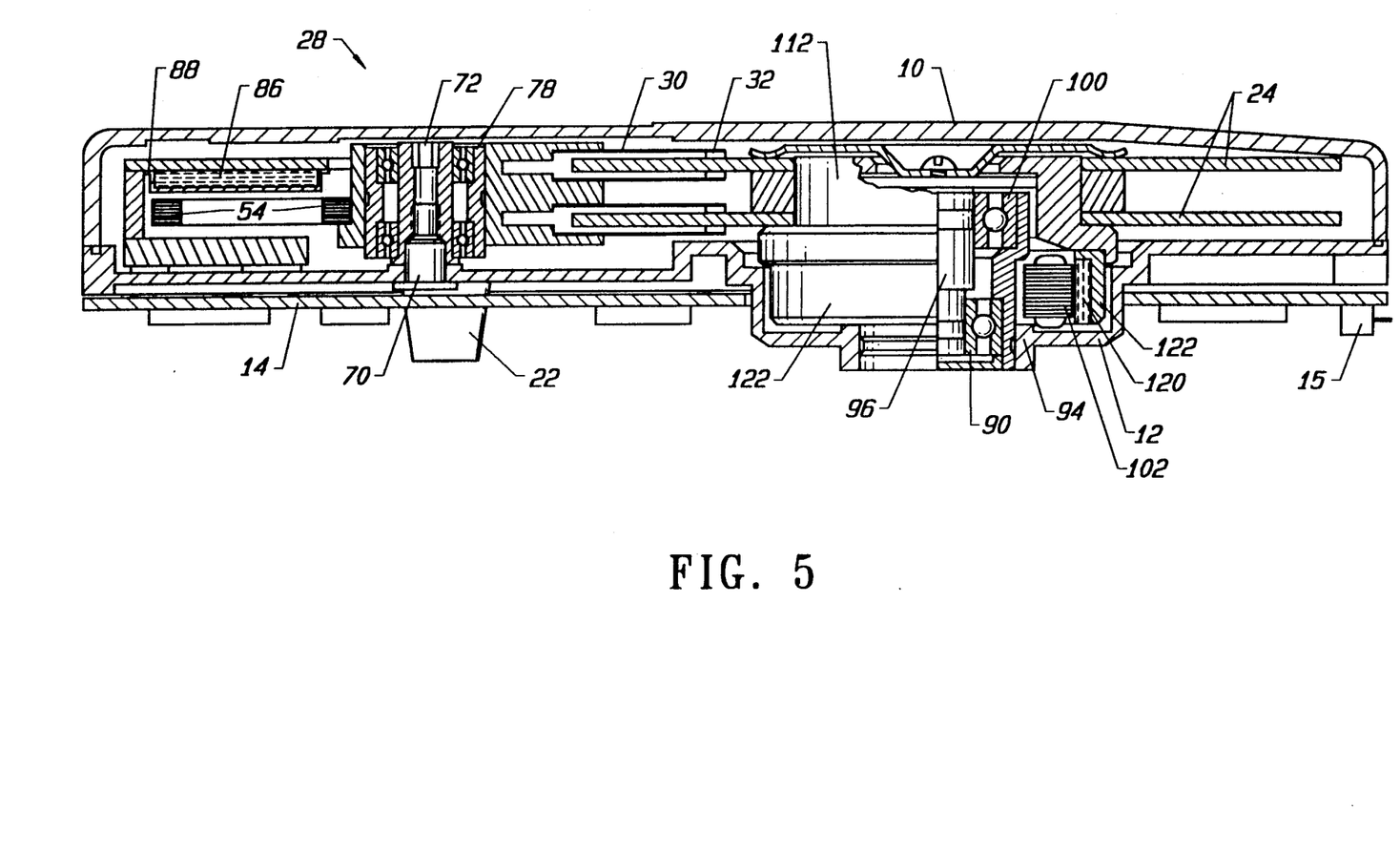
FIG. 5 is a section view of the disk drive taken along the line 5—5 in FIG. 2.

FIG. 5 is a side view in section taken along the line 5—5 of FIG. 2 to illustrate the actuator assembly 28 and the spin motor. The actuator assembly includes four suspensions 30 and heads 32 each accessing a side of the two disks 24. Printed circuit board 14 is mounted on the bottom of base 12 with the disk drive supported by post 22 and the shoulder 94 which receives housing 92 of the spin motor.

Figure 6:
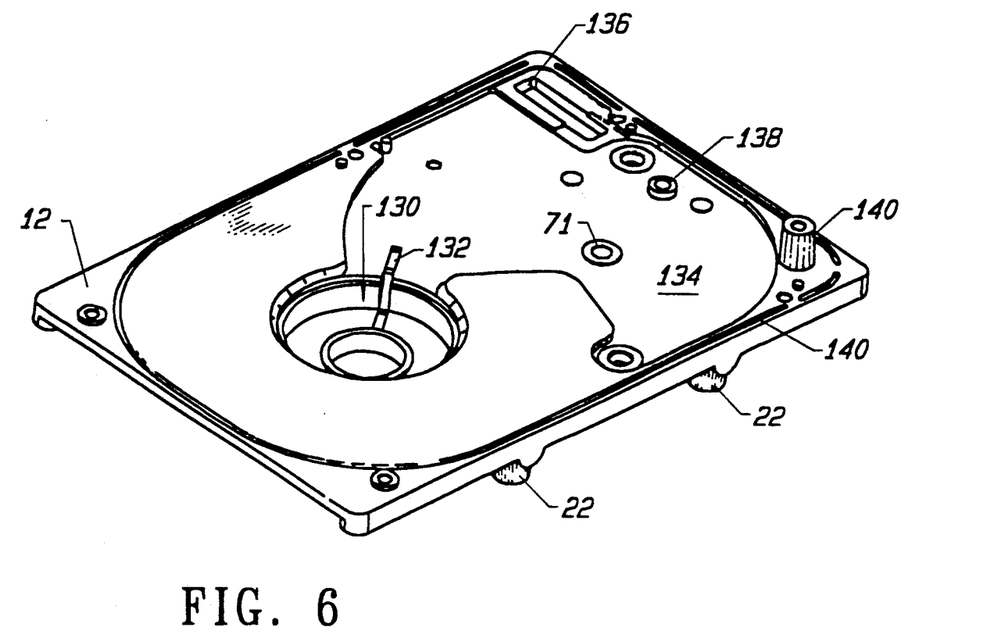
FIG. 6 and FIG. 7 are top and bottom perspective views of the base of the disk drive of FIG. 1.
Figure 7:
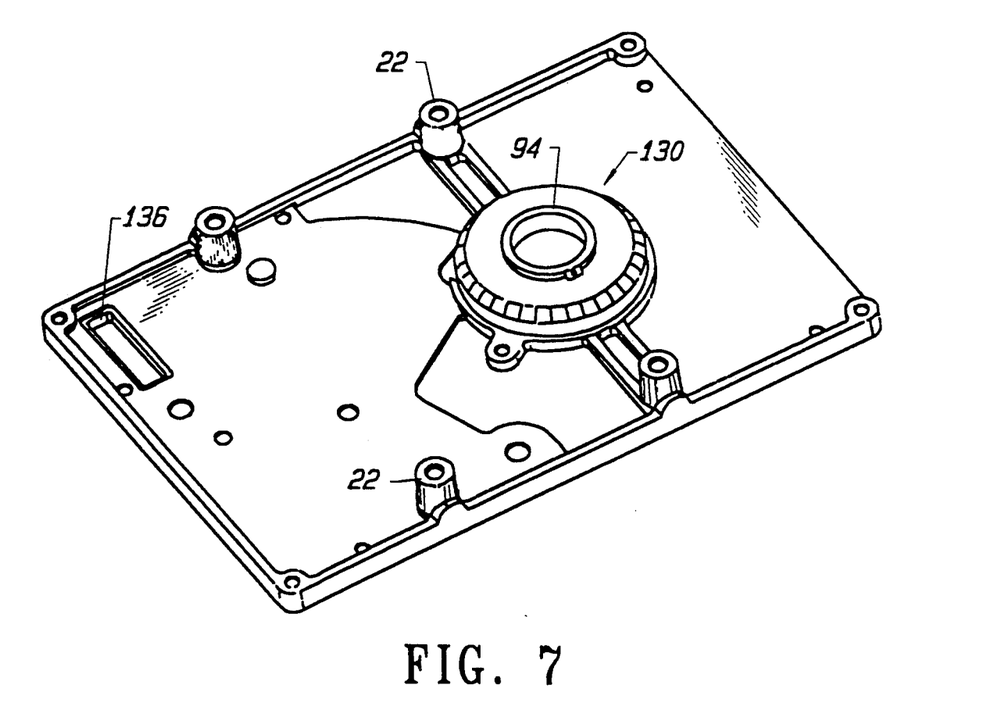

FIGS. 6 and 7 are top and bottom perspective views of the base 12 of the disk drive. The base includes a recessed area 130 for receiving the spin motor with ribbon cable 132 providing electrical connection to the motor. A recessed surface portion 134 receives the bottom plate of the actuator with shoulder 71 receiving the shaft of the actuator. Opening 136 accommodates the header 36 (FIG. 1), and hole 138 is for engaging and receiving the O.D. crash stop. A recessed portion 140 around the periphery of the base receives a gasket which provides a seal between the base and cover. As noted above, the base 112 as well as the cover 10 are preferably formed from cast magnesium alloy with the support surfaces machined to accommodate the spin motor, actuator, and other parts mounted to the base.

Figure 8:
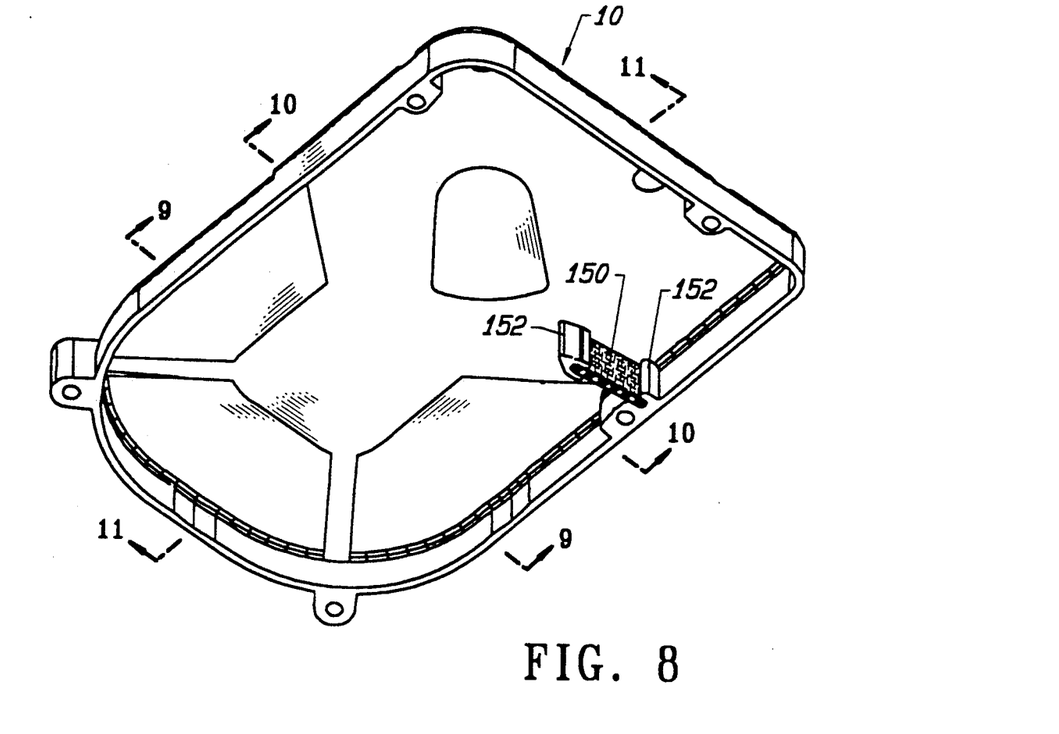
FIG. 8 is a perspective view of the cover of the disk drive of FIG. 1.
Figure 9:
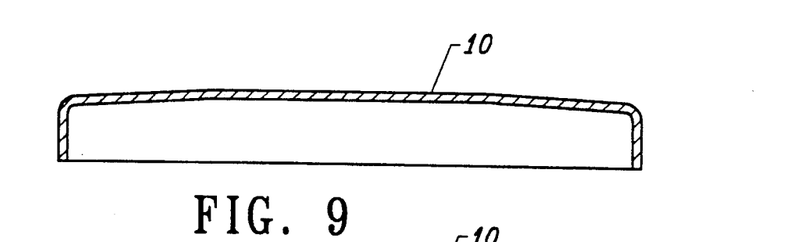
FIGS. 9-11 are section views through the cover of FIG. 8 taken along the lines 9—9, 10—10, and 11—11, respectively.
Figure 10:
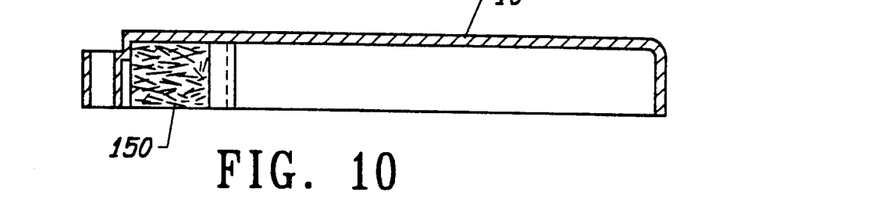
Figure 11:
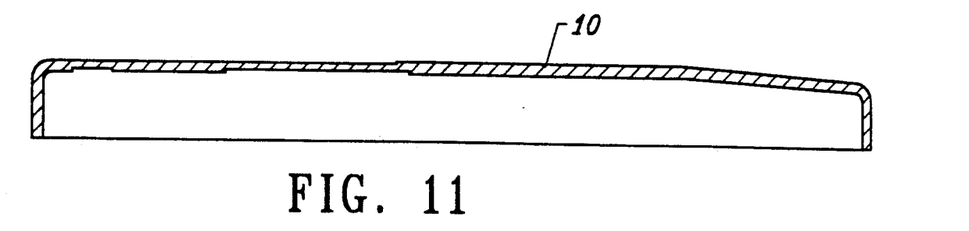

FIG. 8 is a perspective view of the cover 10. A filter material 150 is supported within the cover between supports 152. Air currents created by the rotating disks pass through filter 150 for the removable of particulate matter. FIGS. 9 and 10 are cross-sectional sectional views of the housing taken along the lines 9—9 and 10—10; and FIG. 11 is a longitudinal sectional view of the cover taken along the line 11—11. The sectional view along the line 9—9 is generally above the spinning disks, and it will be noted that the cover bulges outwardly thereby increasing the strength to external pressure changes and in effect forming a Bellville type spring. The section view along the line 10—10 away from the disks is generally flat as noted in FIG. 10.

There has been described a compact and light weight disk drive including a low noise spin motor in accordance with the invention. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

I claim:

1. A low noise spin motor for use in a disk drive comprising:
   a shaft,
   a rotor including a multiple pole annular magnet,
   bearing means for rotatably mounting said rotor to said shaft, said bearing means including first and second ball bearings having different resonant frequencies, said first and second ball bearings having different inside diameters and different outside diameters, and
   stator means for magnetically inducing said rotor to rotate,
   said stator means including a plurality of coils.

2. The spin motor as defined by claim 1 wherein said first ball bearing has a first plurality of balls and said second ball bearing has a second plurality of balls, each ball of said first and second pluralities of balls having the same size.

3. The spin motor as defined by claim 1 wherein said first ball bearing has a first plurality of balls and said second ball bearing has a second plurality of balls, said first plurality of balls and said second plurality of balls having sizes such that, during operation of the spin motor, the first plurality of balls and the second plurality of balls have different rotational speeds.

4. A spin motor for use in a disk drive, comprising:
   a base including a shoulder,
   a shaft,
   first and second ball bearings having different resonant frequencies, said first and second ball bearings being mounted on said shaft, said first and second ball bearings have different inside diameters and different outside diameters,
   a bearing housing in which said bearings are housed, said housing engaging the shoulder in an interference fit,
   a lamination body positioned around said bearing housing,
   a plurality of coils supported on said lamination body;
   a hub supported by said shaft, said hub supporting a multi-disk storage medium, and
   an annular magnet supported by said hub and rotatably positioned around said coils.

5. The spin motor as defined by claim 4 wherein said first ball bearing has a first plurality of balls and said second ball bearing has a second plurality of balls, each ball of said first and second pluralities of balls having the same size.

6. The spin motor as defined by claim 4 wherein said first ball bearing has a first plurality of balls and said second ball bearing has a second plurality of balls, said first plurality of balls and said second plurality of balls having sizes such that, during operation of the spin motor, the first plurality of balls and the second plurality of balls have different rotational speeds.

7. A low noise spin motor for use in a disk drive comprising
   a shaft,
   a rotor including a multiple pole annular magnet,
   bearing means for rotatably mounting said rotor to said shaft, said bearing means including first and second ball bearings having different inside diameter and different outside diameters and wherein said first ball bearing has a first plurality of balls and said second ball bearing has a second plurality of balls, each ball of said first and second pluralities of balls having the same size,
   stator means for magnetically inducing said rotor to rotate,
   said stator means including a plurality of coils.

8. The spin motor as defined by claim 7 wherein said rotor further includes a hub, said hub having a support flange for receiving at least one disk, and a clamp for clamping a disk to said hub.

9. The spin motor as defined by claim 8 wherein said rotor further includes a housing depending from said hub for supporting said annular magnet.

10. The spin motor as defined by claim 9 wherein said bearing means further includes a housing in which said bearings are positioned, said stator means including a multi coil lamination, said lamination positioned around said bearing housing.

11. A spin motor for use in a disk drive comprising
    a shaft,
    first and second ball bearings having different inside diameters and different outside diameters and wherein said first ball bearing has a first plurality of balls and said second ball bearing has a second plurality of balls, each ball of said first and second pluralities of balls having the same size, said ball bearings being mounted on said shaft, a bearing housing in which said bearings are housed, said housing engaging a shoulder in a base in an interference fit, a lamination body positioned around said bearing housing, a plurality of coils supported on said lamination body, a hub supported by said shaft, said hub supporting a multi-disk storage medium, and an annular magnet supported by said hub and rotatably positioned around said coils.

12. A low noise spin motor for use in a disk drive comprising a shaft, a rotor including a multiple pole annular magnet, bearing means for rotatably mounting said rotor to said shaft, said bearing means including first and second ball bearings having different inside diameter and different outside diameters and wherein said first ball bearing has a first plurality of balls and said second ball bearing has a second plurality of balls, said first plurality of balls and said second plurality of balls having sizes such that, during operation of the spin motor, the fist plurality of balls and the second plurality of balls have different rotational speeds, stator means for magnetically inducing said rotor to rotate, said stator means including a plurality of coils.

13. The spin motor as defined by claim 12 wherein said rotor further includes a hub, said hub having a support flange for receiving at least one disk, and a clamp for clamping a disk to said hub.

14. The spin motor as defined by claim 13 wherein said rotor further includes a housing depending from said hub for supporting said annular magnet.

15. The spin motor as defined by claim 14 wherein said bearing means further includes a housing in which said bearings are positioned, said stator means including a multi coil lamination, said lamination positioned around said bearing housing.

16. A spin motor for use in a disk drive comprising a shaft, first and second ball bearings having different inside diameters and different outside diameters and wherein said first ball bearing has a first plurality of balls and said second ball bearing has a second plurality of balls, each ball of said first and second pluralities of balls having the same size, such that during operation of the spin motor the balls of the first ball bearing have a higher rotational speed than the balls of the second ball bearing, said first and second ball bearings further having different resonant frequencies such that said first and second ball bearings do not resonate together and do not develop a beat frequency, said ball bearings being mounted on said shaft, a bearing housing in which said bearings are housed, said housing engaging a shoulder in a base in an interference fit, a lamination body positioned around said bearing housing, a plurality of coils supported on said lamination body, a hub supported by said shaft, said hub supporting a multi-disk storage medium, and an annular magnet supported by said hub and rotatably positioned around said coils.

* * * * *